Figures 1, 2, 3:
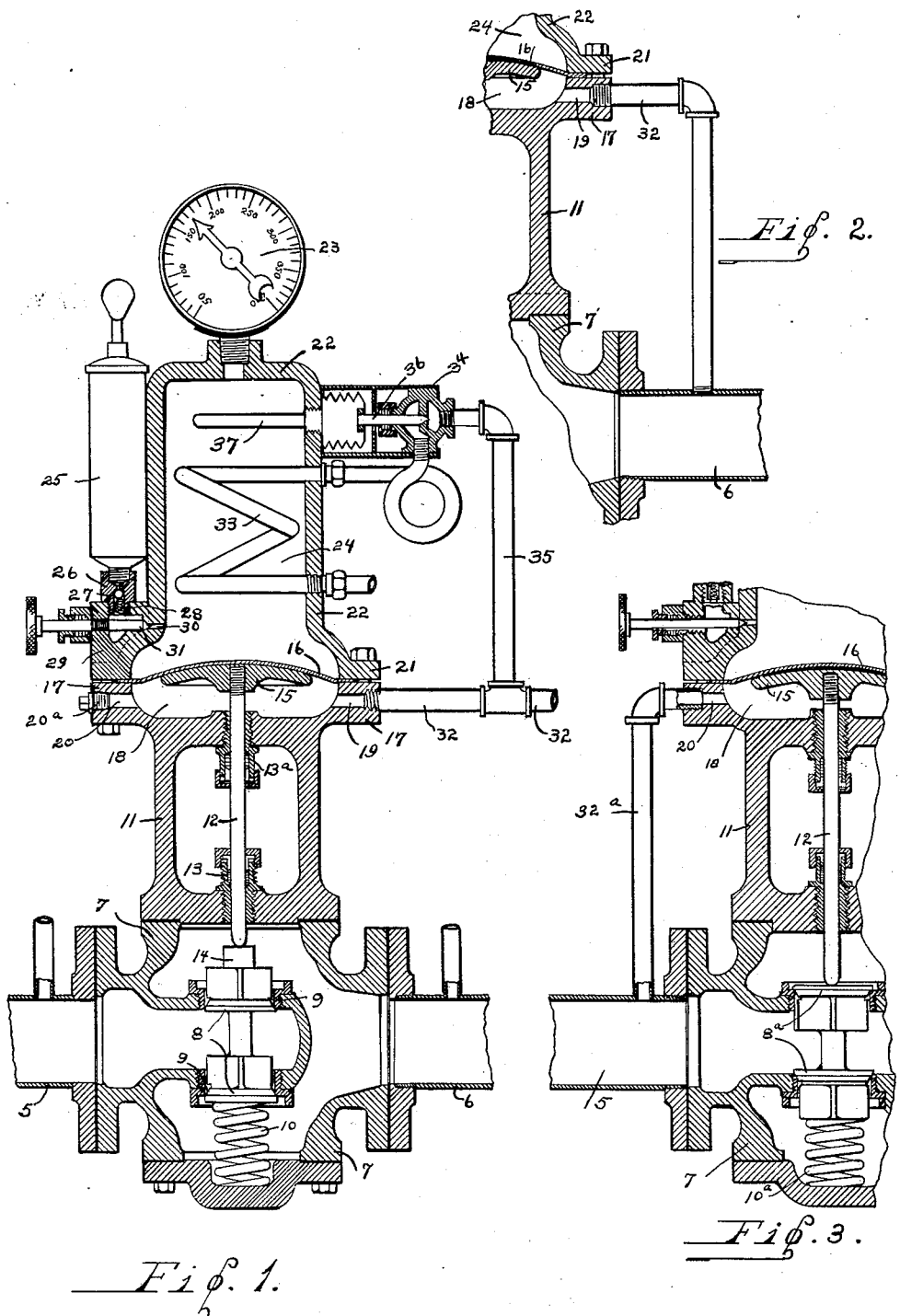

June 23, 1931. D. H. ANNIN 1,810,937
DIFFERENTIAL REGULATOR FOR VALVES
Filed July 7, 1930

Douglas H. Annin,
Inventor.

Patented June 23, 1931

1,810,937

UNITED STATES PATENT OFFICE

DOUGLAS H. ANNIN, OF GLENDALE, CALIFORNIA, ASSIGNOR TO NEILAN, SCHUMACHER & COMPANY, OF LOS ANGELES, CALIFORNIA

DIFFERENTIAL REGULATOR FOR VALVES

Application filed July 7, 1930. Serial No. 465,961.

This invention relates to means for regulating a valve in a fluid passage in accordance with prearranged pressure conditions in the system or apparatus in which the valve is employed, the valve being controlled by a diaphragm which is itself controlled by fluid pressure on its opposite sides. The fluid acting with variable pressures on one side of the diaphragm may be supplied from different sources, depending upon the specific purpose for which the valve is employed, while the fluid acting upon the opposite side of the diaphragm, at a constant but preselected pressure, is forced into a chamber which is, in part, closed by the diaphragm. The diaphragm is thus flexed in accordance with the differences in pressures upon its opposite sides, and the extent of its flexure at any moment determines the position of the valve. The invention may be employed for various purposes, such as for regulating the flow of fuel to the furnace of a boiler in accordance with the boiler pressure, for reducing a high pressure of a fluid to a lower pressure or for maintaining a constant pressure of a fluid. The accompanying drawings show the invention employed for these purposes as examples of its possible uses.

When the fluid employed to give constant pressure on one side of the diaphragm is a gas, such as air, its pressure will vary with changes in its temperature. For this reason, means are employed for maintaining the temperature of this gas constant, and this means comprises a part of my invention.

While I have complied with the requirements as to making a definite and specific disclosure of my invention, I realize that it may be embodied in structures differing in detail from any herein disclosed, and I wish it to be understood that the claims hereof are not intended to be limited to such details any farther than the specific terms make necessary.

In the drawings, which illustrate what is my present preferred forms of the invention, Fig. 1 is a central sectional view through the regulator as employed for maintaining a substantially constant pressure in a steam boiler; Fig. 2 shows a portion of the structure illustrated in Fig. 1 with the pipe connections so modified as to cause the regulator to maintain a substantially constant difference in pressure on the opposite sides of a valve, and Fig. 3 also shows a portion of the structure of Fig. 1 with the pipe connections so arranged as to maintain a substantially constant pressure at the inlet side of the valve, the valve in this case being inverted from the position shown in Fig. 1.

In the drawings, 5 represents the inlet and 6 the outlet pipes for a fluid, said pipes being suitably connected through a valve casing 7 within which is a balanced valve 8. In Fig. 1 this valve is held to its seat 9 by a spring 10. Since the specific structure of the valve and casing is no part of my invention, except in combination, more detailed description thereof is deemed unnecessary.

Mounted upon the valve casing is a member 11 through which extends a plunger 12, the latter passing through suitable packing glands 13 and 13a, as shown. The lower end of the plunger rests upon a member 14 which forms the upper end of the stem of the valve 8. Attached to the upper end of the plunger is a head 15 which bears against a diaphragm 16, the diaphragm being normally arched upwardly. The head covers a substantial part of the lower side of the diaphragm and is shaped to fit the concaved side of the latter. The upper end of the member 11 is flanged at 17 and is dished to form a chamber 18 below the diaphragm. The flange is provided with a passage 19 therethrough, for a purpose hereinafter set forth; and, if preferred, it may have a similar passage 20 in its diametrically opposite side.

The diaphragm is held at its marginal edges between the flange 17 and a similar flange 21 on a casing 22. This casing is open at its lower end, except as it is closed by the diaphragm. Just above the diaphragm the casing is of a size corresponding to that of the chamber 18; but it is then drawn in rather abruptly and is extended upwardly, preferably in the form of a cylinder, the upper end being closed, except for a threaded opening within which a pressure gage 23 is secured. The interior of the casing forms a chamber 24 within which a fluid may be compressed, as by means of a pump 25. While any suitable fluid may be used, it is more convenient and therefore more desirable to employ air, and I shall hereafter refer to the pump 25 as an air pump. The pump is attached to a member 26 which has a ball valve 27 therein, the valve being normally held against its seat by a spring 28 to close a passage through the member. The member 26 has threaded engagement with a boss 29 on the casing 22, said boss having a bore therein which communicates with the passage in the member 26 and, through a port 30, with the chamber 24. The said port is adapted to be closed by a needle valve 31. When this valve is opened and the pump is operated, air is forced into the chamber 24 to any desired pressure, which is registered on the gage 23, after which the needle valve is closed.

With the parts thus described assembled as in Fig. 1, the device is adapted to control the passage of fuel, such as gas, from the inlet pipe 5 to the outlet pipe 6 which leads to the burner for heating a boiler, neither the burner nor the boiler being shown. The chamber 18 below the diaphragm is connected, through a pipe 32, with the steam space of the boiler so that the lower side of the diaphragm is subjected to the boiler pressure. For purpose of illustration, it will be assumed that said pressure is one hundred pounds and that it is to be maintained at that point. Air is now pumped into the chamber 24 until a pressure is reached which, acting on the upper surface of the diaphragm, is just sufficient to unseat the valve 8. Owing to the fact that the spring 10 acts to close the valve, the pressure in the chamber 24 must be such as to overcome both the boiler pressure acting on the under side of the diaphragm and the force of the spring. The reading of the gage 23 will, however, approximate 100. If, now, the boiler pressure falls, the air pressure in the chamber 24 depresses the diaphragm, thereby opening the valve 8 more widely and furnishing more fuel to the burner. When the boiler pressure again reaches one hundred pounds, the diaphragm returns toward its position of Fig. 1 to reduce or cut off the fuel.

While the temperature of the air within the chamber 24 remains constant, the regulator as described is adequate to maintain the boiler pressure substantially constant. But, owing to changes in the weather and in the amount of heat radiated to and from the casing 22, it is necessary in practice to provide means for preventing the said temperature from dropping a substantial amount; for, as it drops the valve 8 closes and does not permit sufficient fuel to pass to maintain the desired boiler pressure. I therefore place a coil 33 of pipe within the chamber 24 and connect one of its ends to a valve casing 34 which is mounted on the casing 22. This valve casing is connected, through a pipe 35 either with the boiler or, more conveniently, with the pipe 32 which leads to the boiler. Within the valve casing is a needle valve 36 which is suitably packed and is adapted to open or close the steam passage through the casing. The other end of the coil 33 is led outside the casing 22 so that the steam may escape.

The valve 36 is controlled by a thermostat which is so associated with the casing 22 as to be effected by the temperature of the air therein. Any suitable type of thermostat may be employed, that shown comprising a tube 37 which is threaded through the casing 22 and is projected into the chamber 24, being closed at its inner end. Outside the casing the tube opens into a bellows-like member 38, to the outer wall of which the needle valve 36 is secured. The space within the tube 37 and the member 38 is closed and contains a quantity of liquid, the latter being so selected as to volatilize at substantially the temperature at which the air in the chamber 24 is to be maintained. If, then, this temperature falls, the volatilized or partially volatilized liquid condenses, the bellows at 38 collapses and the valve 36 is drawn back to open the passage to the steam from the pipe 35. This permits steam to pass through the coil 33 until the temperature of the air is restored and the liquid in the thermostat is again volatilized in an amount sufficient to close the valve 36.

While it is convenient, and is therefore preferred, to heat the coil 33 by steam, as described, it is obvious that hot air or other gases or even hot water, oil or other liquid can be employed for that purpose if desired.

The arrangement shown in Fig. 2 is employed when it is desired to maintain a constant pressure on the outlet side of the valve, or for reducing a high pressure on the inlet side to a low pressure on the outlet side. Only so much of the structure is shown in Fig. 2 as is required to show the departure made from the arrangement shown in Fig. 1. Instead of leading the pipe 32 to the boiler or to a connection with the boiler, it is led directly to the outlet pipe 6. With this arrangement, the space 18 below the diaphragm is filled with the fluid from pipe 6 and at the pressure in said pipe. If, for example, the pressure in the inlet pipe 5 is 100 pounds and it is desired to reduce it to 15 pounds in the outlet pipe 6, the air in the chamber 24 is pumped up to a pressure of fifteen pounds, or slightly above that amount to overcome the spring 10. If thereafter the pressure in the pipe 6 rises, the diaphragm is raised and the valve 8 is closed until the pressure again falls to normal. The fluid passing through the valve may be either gas or liquid. If steam from a boiler is available for heating the coil 33 it is preferably used. Otherwise, the coil may be heated by such hot gases or liquids as are above suggested.

In Fig. 3 the parts are arranged for maintaining a constant pressure in the inlet pipe 5. The space 18 below the diaphragm is connected, through a pipe 32a, with the inlet pipe. In this case the valve 8a is reversed or inverted and the spring 10a acts to open it. Assuming that the pressure in pipe 5 is to be maintained at one hundred pounds, the air in the chamber 24 is pumped up to or slightly above one hundred pounds. If, then, the pressure in the pipe 5 should rise, the valve would open to permit enough of the fluid to escape to reduce the pressure to normal. As in the other structures described, the coil 33 may be heated by steam, if readily available, or by such other hot gases or liquids as have been referred to.

In case the flange 17 of the member 11 is provided with the two passages, 19 and 20, as shown in Fig. 1, the pipe 32 may be connected with either passage, the other being closed, as by a plug 20a. In the form shown in Fig. 3, the pipe 32a is connected with the passage 20 and the plug would then be used to close the passage 19. Instead of using the passage 20, however, the member 11 may be turned to bring the passage 19 into position over the pipe 5. It is therefore unnecessary to have the two passages, but I prefer to provide them for purpose of convenience in adapting the assembly of Fig. 1 to the use of the assembly of Fig. 3.

Having thus described my invention, I claim:

1. Means for maintaining a constant pressure in a fluid, comprising a valve for controlling the pressure of said fluid, a chamber, a diaphragm extending across the chamber, means for causing the fluid the pressure of which is to be maintained to act on one side of said diaphragm within the chamber, an air pump connected with the chamber on the opposite side of said diaphragm for creating an air pressure in that part of the chamber substantially equal to that which is to be maintained in the first mentioned fluid, whereby the diaphragm is flexed by the differential pressures of the fluid and the air, connections between said diaphragm and the valve for positioning the latter in accordance with the position of the diaphragm and means under control of the air in said chamber for maintaining a substantially constant temperature of the air in said chamber.

2. Means for maintaining a constant steam pressure in a boiler, comprising a valve for controlling the pressure of said steam, a chamber, a diaphragm extending across said chamber and dividing it into two parts, connections from the boiler to one part of the chamber for maintaining a pressure on that side of the diaphragm which is equal to the pressure within the boiler, an air pump, connections between said pump and that part of the chamber which is on the opposite side of the diaphragm from the first mentioned part, whereby air pressure may be created on the diaphragm to oppose the boiler pressure, said air pressure to be maintained at the desired boiler pressure, connections between the diaphragm and the valve for causing the latter to move in accordance with the movements of the diaphragm due to the differential pressures of the steam and air, and means under control of the air in said chamber for maintaining a substantially constant temperature of the air in said chamber.

3. Means for maintaining a constant pressure in a fluid, comprising a valve for controlling the pressure of said fluid, a chamber, a diaphragm extending across the chamber and dividing it into two parts, means for causing the fluid the pressure of which is to be maintained to act on one side of said diaphragm within the chamber, an air pump connected with the chamber on the opposite side of said diaphragm for creating an air pressure in that part of the chamber which is substantially equal to that which is to be maintained in the first mentioned fluid, whereby the diaphragm is flexed by the differential pressures of the fluid and the air, connections between said diaphragm and the valve for positioning the latter in accordance with the position of the diaphragm, a thermostat extending into that part of the chamber which contains the air, and means under control of said thermostat for maintaining the said air at a substantially constant temperature.

4. Means for maintaining a constant pressure in a fluid, comprising a valve for controlling the pressure of said fluid, a chamber, a diaphragm extending across the chamber and dividing it into two parts, means for causing the fluid the pressure of which is to be maintained to act on one side of said diaphragm within the chamber, an air pump connected with the chamber on the opposite side of said diaphargm for creating an air pressure in that part of the chamber which is substantially equal to that which is to be maintained in the first mentioned fluid, whereby the diaphragm is flexed by the differential pressures of the fluid and the air, connections between said diaphragm and the valve for positioning the latter in accordance with the position of the diaphragm, a thermostat extending into that part of the chamber which contains the air, a coil for heated fluid within said part of the chamber, and a valve under control of said thermostat for admitting heated fluid to said coil, for the purpose specified.

5. Means for maintaining a constant steam pressure in a steam boiler, comprising a valve for controlling the pressure of said steam, a chamber, a diaphragm extending across said chamber and dividing it into two parts, connections from the boiler to one part of the chamber for maintaining a pressure on that side of the diaphragm which is equal to the pressure within the boiler, an air pump, connections between said pump and that part of the chamber which is on the opposite side of the diaphragm from the first mentioned part, whereby air pressure may be created on the diaphragm to oppose the boiler pressure, said air pressure to be maintained at substantially the desired boiler pressure, connections between the diaphragm and the valve for causing the latter to move in accordance with the movements of the diaphragm due to the differential pressures of the steam and air, a thermostat extending into that part of the chamber which contains the air, and means under control of said thermostat for maintaining the said air at a substantially constant temperature.

6. Means for maintaining a constant steam pressure in a boiler, comprising a valve for controlling the pressure of said steam, a chamber, a diaphragm extending across said chamber and dividing it into two parts, connections from the boiler to one part of the chamber for maintaining a pressure on that side of the diaphragm which is equal to the pressure within the boiler, an air pump, connections between said pump and that part of the chamber which is on the opposite side of the diaphragm from the first mentioned part, whereby air pressure may be created on the diaphragm to oppose the boiler pressure, said air pressure to be maintained at the desired boiler pressure, connections between the diaphragm and the valve for causing the latter to move in accordance with the movements of the diaphragm due to the differential pressures of the steam and air, a coil for heated fluid within that part of the chamber containing the air, and a thermostat in the said part of the chamber for controlling the flow of heated fluid through the coil.

7. Means for maintaining a constant pressure in a fluid, comprising a valve for controlling the pressure of said fluid, a pressure responsive member, means for causing the fluid the pressure of which is to be maintained to act on one side of said member, means for causing an opposing fluid to act on the opposite side of said member at pressure substantially equal to that which is to be maintained in the first mentioned fluid, whereby the said member is moved differentially by the said fluids, connections between said member and the valve for positioning the latter in accordance with the position of said member, and means under control of the said opposing fluid for maintaining the temperature of said opposing fluid substantially constant.

8. Means for maintaining a constant pressure in a fluid, comprising a valve for controlling the pressure of said fluid, a chamber, a pressure-responsive member within said chamber and dividing it into two parts, means for causing the fluid the pressure of which is to be maintained to act on one part of the said member to move it in one direction, means for causing compressed air to act on said member in opposition to the said fluid, the pressure of the air being maintained at substantially the desired pressure of said fluid whereby the member is moved within the chamber in accordance with the differences of pressure of the fluid and the air, connections between said member and the valve for positioning the latter in accordance with the position of said member, a thermostat responsive to the temperature of the air in said chamber, and means under control of said thermostat for maintaining said air at a substantially constant temperature.

In testimony whereof I have signed my name to this specification.

DOUGLAS H. ANNIN.